(12) United States Patent
Marshall

(10) Patent No.: US 11,905,118 B2
(45) Date of Patent: Feb. 20, 2024

(54) ROLLER BELT WITH SUPPORT EDGES

(71) Applicant: Laitram, L.L.C., Harahan, LA (US)

(72) Inventor: Angela Longo Marshall, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 35 days.

(21) Appl. No.: 17/628,716

(22) PCT Filed: Jul. 17, 2020

(86) PCT No.: PCT/US2020/042566
§ 371 (c)(1),
(2) Date: Jan. 20, 2022

(87) PCT Pub. No.: WO2021/025848
PCT Pub. Date: Feb. 11, 2021

(65) Prior Publication Data
US 2022/0315344 A1 Oct. 6, 2022

Related U.S. Application Data

(60) Provisional application No. 62/884,049, filed on Aug. 7, 2019.

(51) Int. Cl.
*B65G 17/24* (2006.01)
*B65G 39/20* (2006.01)
(52) U.S. Cl.
CPC .............. *B65G 17/24* (2013.01); *B65G 39/20* (2013.01)

(58) Field of Classification Search
None
See application file for complete search history.

(56) References Cited

U.S. PATENT DOCUMENTS

| 1,852,942 | A | * | 4/1932 | Streine | ................. | B65G 17/061 |
| | | | | | | 198/779 |
| 3,040,379 | A | * | 6/1962 | Bayer | ..................... | B29C 53/24 |
| | | | | | | 425/371 |
| 3,934,707 | A | | 1/1976 | Bowman | | |
| 4,293,064 | A | | 10/1981 | Robinson | | |
| 7,234,589 | B2 | | 6/2007 | Sedlacek | | |
| 7,533,766 | B1 | | 5/2009 | Fourney | | |
| 8,167,118 | B2 | * | 5/2012 | Fourney | ................. | B65G 17/24 |
| | | | | | | 198/779 |
| 8,225,922 | B1 | * | 7/2012 | Fourney | ................. | B65G 17/24 |
| | | | | | | 198/779 |
| 9,434,547 | B2 | * | 9/2016 | Marshall | ............... | B65G 17/345 |
| 9,815,632 | B2 | | 11/2017 | DePaso et al. | | |

(Continued)

FOREIGN PATENT DOCUMENTS

DE         10027229  A1    12/2001

OTHER PUBLICATIONS

Extended European Search Report, European Patent Application No. 20850483.7, dated Jul. 27, 2023, European Patent Office, Munich, Germany.

*Primary Examiner* — Kavel Singh
(74) *Attorney, Agent, or Firm* — James T. Cronvich

(57) ABSTRACT

A modular conveyor belt with sturdy edges capable of supporting the weight of the belt along a carryway. The sturdy edges have bearing surfaces, such as the peripheries of wheels or the faces of wear pads, mounted at the sides of the belt to bear the belt's weight when the belt rollers are not supported on a roller-activation system.

16 Claims, 5 Drawing Sheets

(56) References Cited

U.S. PATENT DOCUMENTS

| | | |
|---|---|---|
| 10,442,626 B2 | 10/2019 | Marshall et al. |
| 10,604,346 B2 * | 3/2020 | Garbagnati ............ B65G 17/40 |
| 2006/0070857 A1 | 4/2006 | Fourney |
| 2012/0080290 A1 | 4/2012 | Fourney |

* cited by examiner

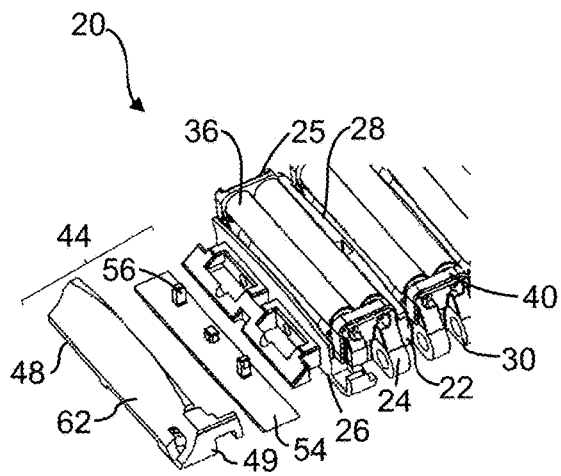
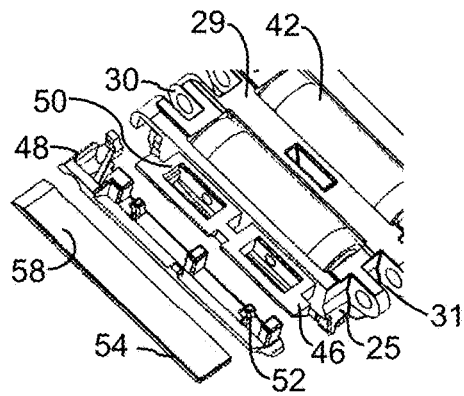
FIG. 1A
FIG. 1B
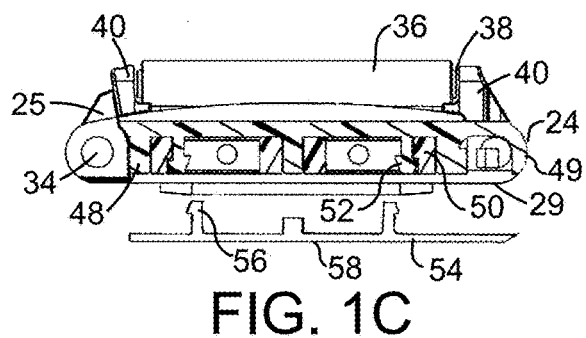
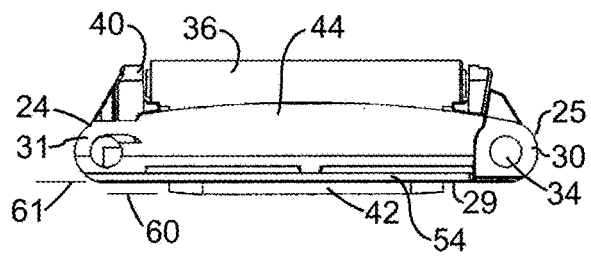
FIG. 1C
FIG. 1D
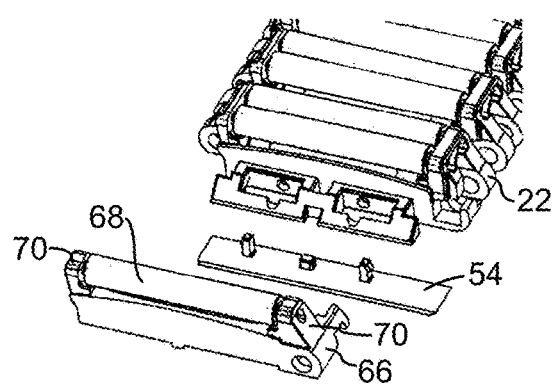
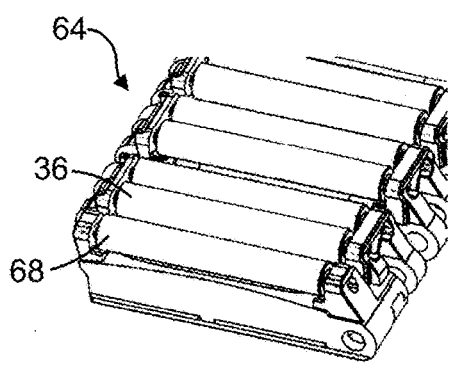
FIG. 2A
FIG. 2B

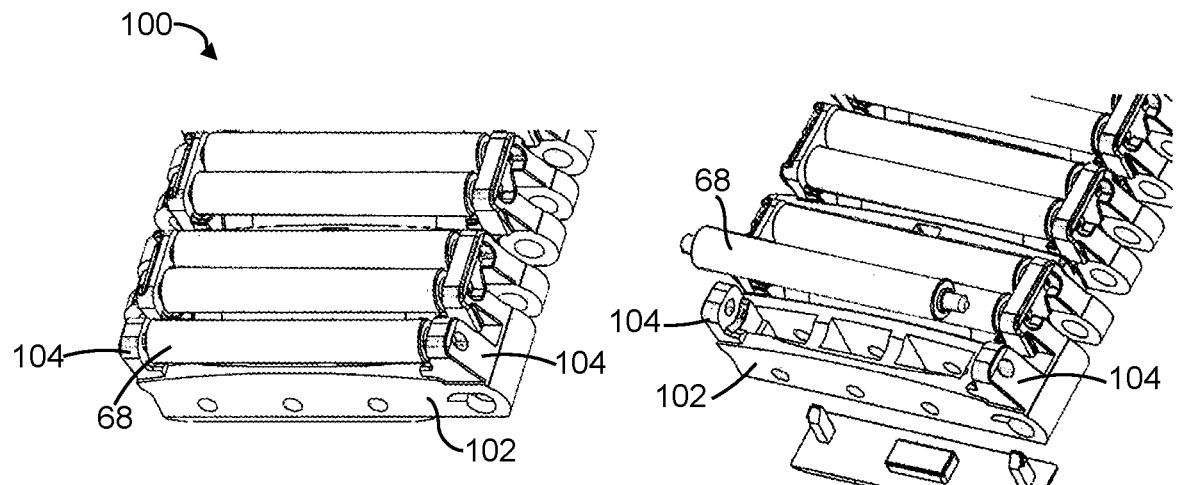
FIG. 5A
FIG. 5B
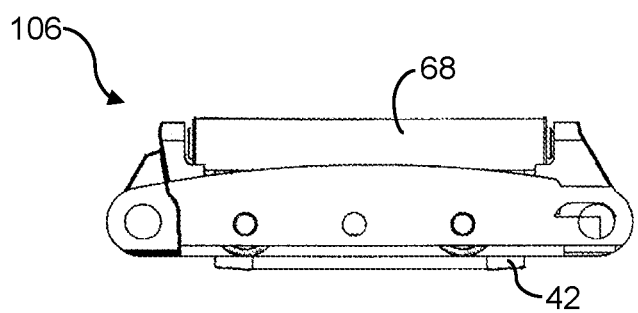
FIG. 6A
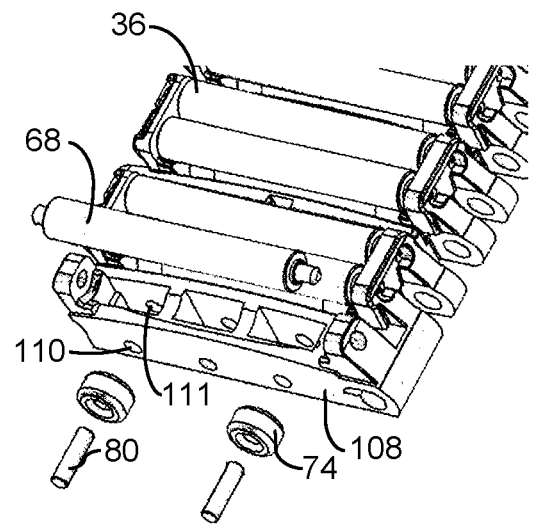
FIG. 6B

ROLLER BELT WITH SUPPORT EDGES

BACKGROUND

The invention relates generally to power-driven conveyors and more particularly to conveyor belts with article-diverting rollers and support edges.

Conveyor belts having article-diverting belt rollers rotated by contact with rollers or flat surfaces in the carryway are used to sort, center, align, or otherwise divert conveyed articles. The belt rollers are arranged to rotate on their axes in a direction oblique or perpendicular to the direction of belt travel. The belt rollers protrude past the top and bottom surfaces of the belt. A roller-activation system in the conveyor carryway has contact surfaces that are selectively moved into and out of contact with the bottoms of the belt rollers. As the belt advances along the carryway in the direction of belt travel, the belt rollers rotate as they ride on the contact surfaces to divert articles atop the belt rollers. When contacting the belt rollers, the contact surfaces also support the belt along the carryway. When the contact surfaces are positioned out of contact with the belt rollers, the contact surfaces are not available to rotate the belt rollers or support the belt. In that situation the belt has to be supported in the carryway in another way. Examples of such roller belts are the INTRALOX® Series 7000 Transverse Roller belt and the Series 7050 Dual-Stacked Transverse Roller belt manufactured and sold by Intralox, L.L.C., of Harahan, Louisiana, U.S.A., and activated by the INTRALOX® S7000 Rack and Roll carryway. Such roller belts and roller-activation systems are described in U.S. Pat. Nos. 7,461,739; 7,506,751; 8,225,751; and 9,079,717.

SUMMARY

One version of a conveyor belt module embodying features of the invention comprises a module body that extends in a length direction from a first end to a second end, in a width direction from a first side to a second side, and in thickness from a top to a bottom. First belt rollers are mounted in the module body with salient portions protruding outward of the bottom of the module body to a first level. First and second edge portions are at the first and second sides of the module body. Each edge portion includes a bearing surface that extends to a second level between the first level and the bottom of the module body.

One version of a conveyor belt embodying features of the invention comprises a series of conveyor belt modules. Each belt module includes a module body that extends in a length direction from a first end to a second end, in a width direction from a first side to a second side, and in thickness from a top to a bottom. First hinge elements are spaced apart along the first end, and second hinge elements are spaced apart along the second end. First belt rollers are mounted in the module body with salient portions protruding outward of the bottom of the module body to a first level. First and second edge portions are at the first and second sides of the module body. Each edge portion includes a bearing surface that extends to a second level between the first level and the bottom of the module body. The first hinge elements of the conveyor belt modules are interleaved with and connected to the second hinge elements of adjacent ones of the conveyor belt modules to form an endless belt loop.

A conveyor embodying features of the invention comprises a carryway and a conveyor belt supported in the carryway. A first wearstrip in the carryway lies under the bearing surface on the belt's first edge portion, and a second wearstrip in the carryway lies under the bearing surface on the belt's second edge portion. A roller-activation system in the carryway has a contact surface that is movable from a first position in contact with the belt rollers to cause the belt rollers to rotate as the conveyor belt advances on the carryway to a second position out of contact with the belt rollers. The weight of the conveyor belt is borne by the roller-activation system in the first position and by the first and second wearstrips when the roller-activation system is in the second position.

BRIEF DESCRIPTION OF THE DRAWINGS

FIGS. 1A-1D are top exploded isometric, bottom exploded isometric, side elevation cross section, and side elevation views of a side edge of a first version of a conveyor belt module embodying features of the invention.

FIGS. 2A-2B are top exploded isometric and top isometric views of a side edge of a second version of a conveyor belt module embodying features of the invention.

FIGS. 5A-5B are top isometric and top exploded isometric views of a fifth version of a conveyor belt module embodying features of the invention.

FIGS. 6A-6B are side elevation and top exploded isometric views of a side edge of a sixth version of a conveyor belt module embodying features of the invention.

DETAILED DESCRIPTION

Figure 3A:
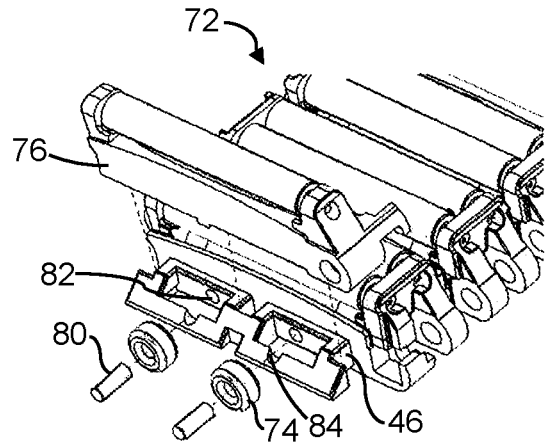
FIGS. 3A-3C are top exploded isometric, bottom exploded isometric, and side elevation views of a side edge of a third version of a conveyor belt module embodying features of the invention.

One version of a conveyor belt module embodying features of the invention is shown in FIGS. 1A-1D. The belt module 20 includes a module body 22 that extends in a length direction from a first end 24 to a second end 25, in a width direction from a first side 26 to an opposite second side (not shown), and in thickness from a top 28 to a bottom 29. Hinge elements 30, 31 are spaced apart along the first and second ends 24, 25 of the module body 22. Lateral holes 34 through the hinge elements 30, 31 receive a hinge rod (not shown). Belt modules 20 are linked together by interleaving the hinge elements 30, 31 of the module with the hinge elements 31, 30 of adjacent modules. Hinge rods received in lateral passageways through the aligned holes 34 of the interleaved hinge elements 30, 31 connect the modules together at hinge joints.

Pairs of article-supporting belt rollers 36 extend outward of the top 28 of the module body 22. The rollers 36 are partly or wholly above the level of the top 28 of the module body 22. The article-supporting belt rollers 36 are mounted on axles 38 whose ends are supported in stanchions 40. The axles 38 are parallel to the length direction of the module body 22 so that the rollers rotate in the width direction on the axles. Lower rollers 42 have salient portions that extend outward of the bottom 29 of the module body 22. The lower rollers 42 are mounted on axles (not shown) within the module body between the top 28 and the bottom 29. The lower rollers' axles are parallel to the axles 38 of the article-supporting rollers 36. Each lower roller 42 contacts a pair of the upper article-supporting rollers 36 so that, when a lower roller is caused to rotate, its rotation in one lateral direction causes the contacting pair of upper rollers to rotate in the opposite lateral direction.

At each side 26 of the module body is an edge portion 44. The edge portion 44 includes a mounting base 46 monolithically formed with the module body 22. A detachable outermost edge member 48 attaches to retention structure 50 in the mounting base 46. A hinge element 49 with a rod hole is formed at one end of the edge member 48. Tabs 52 with shoulders snap in place in the mounting base 46 and are detachably retained by the retention structure 50 engaging the tab shoulders. A detachable wear pad 54, also having tabs 56 with shoulders, snaps in place in the edge portion 44 and is retained by the tabs 52 of the detachable outermost edge member 48. The wear pad 54 has a flat outer face 58 as a bearing surface that can slide along a wearstrip on the upper carryway path of a belt constructed of the modules 20. The wear pad 54 is made of a durable, wear-resistant material, such as UHMW plastic. And for lower-friction sliding, the wear pad 54 can include PTFE. The salient portions of the lower rollers 42 extend to a level 60 below the level 61 of the face 58 of the wear pad 54. The detachable outermost edge member 48 has a sloped outer side 62 that tapers inwardly toward the top 28 of the module body 22. The taper can be linear or it can be concavely curved, to allow for placement of a side-off discharge close to the side of the module 20.

Another version of a conveyor belt module is shown in FIGS. 2A and 2B. The module body 22, the article-supporting rollers 36, the lower rollers, and the wear pad 54 are the same as those in FIGS. 1A-1D. The difference is that the conveyor belt module 64 has a detachable outermost edge member 66 that includes a freely rotatable edge roller 68 on an axle whose ends are supported by stanchions 70. The axis of the axle is parallel to the axes of the axles of the pairs of article-supporting rollers 36. The edge roller 68, which is disposed outside of the outermost article-supporting roller 36, is passive because it is not rotated by contact with a lower roller.

Figure 3B:
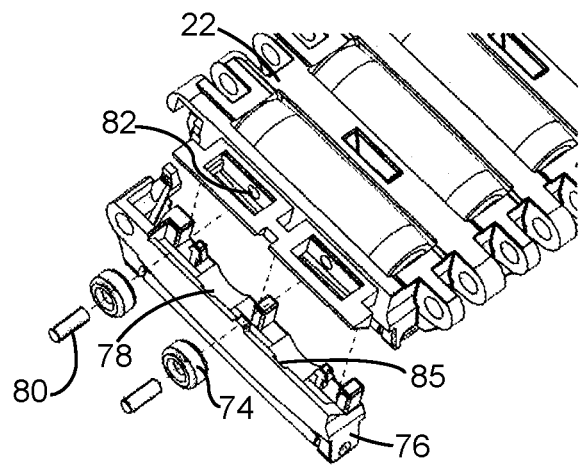
Figure 3C:
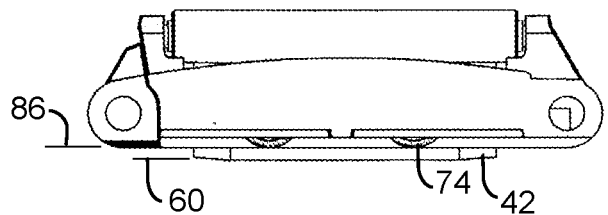

In a third version shown in FIGS. 3A-3C, a roller-belt module 72 has wheels 74 that can roll along carryway wearstrips in low-friction rolling contact. The detachable outermost edge member 76 differs from the edge member 66 of FIG. 2A in that it includes wheel wells 78 in a bottom side to accommodate the wheels 74. The wheels 74 are mounted on parallel axles 80 whose axes are in the width direction so that the wheels rotate in the length direction. The ends of the axles 80 are retained in cavities 82 in the mounting base 46 at one end and in complementary half-cavities 84, 85 in the mounting base and the detachable outermost edge member 76 at the other end. Salient portions of the lower rollers 42 extend to a level 60 below the level 86 of the periphery of the wheel 74. The peripheries of the wheels 74 serve as bearing surfaces against a carryway wearstrip.

Figure 4A:
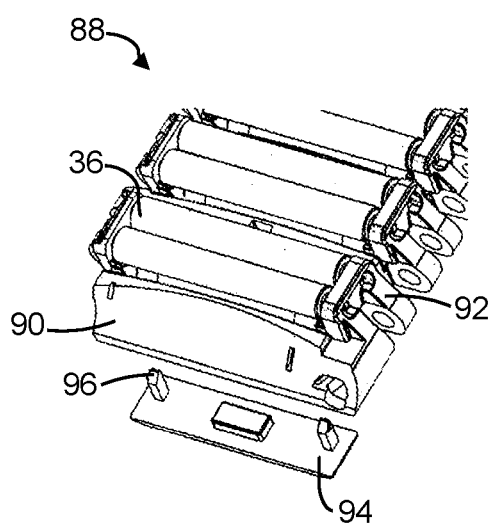
FIGS. 4A-4B are top exploded isometric and enlarged cross sectional views of a side edge of a fourth version of a conveyor belt module embodying features of the invention.
Figure 4B:
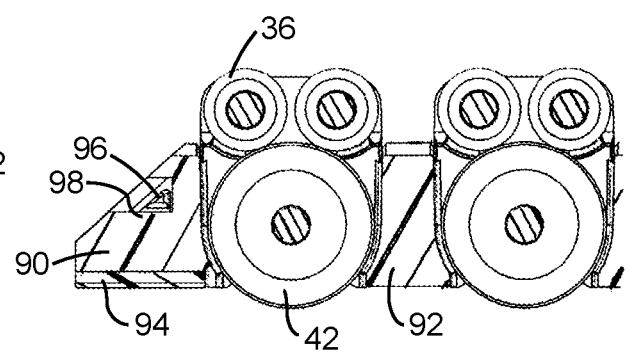

Yet another version of a conveyor belt module embodying features of the invention is shown in FIGS. 4A and 4B. The belt module 88 differs from the module of FIGS. 1A-1D in that it has an edge portion 90 monolithically formed with the module body 92. Although the monolithic edge portion 90 is not detachable, a wear pad 94 with tabs 96 is. The tabs 96 allow the wear pad 94 to snap in place retained by locking structure 98 in the edge portion 90. FIG. 4B also shows how the lower rollers 42 coact with the pairs of upper article-supporting rollers 36 to rotate them in a direction opposite to the direction of rotation of the lower roller they contact. The roller-to-roller interaction is the same for all the described versions of conveyor belt modules having both upper and lower rollers.

The conveyor belt module 100 of FIGS. 5A and 5B differs from the module in FIGS. 4A-4B in that it has a monolithic edge portion 102 with stanchions 104 at the top to support a passive edge roller 68. Like the belt module of FIGS. 4A and 4B, the belt module 100 includes structure to retain the detachable wear pad 94.

FIGS. 6A and 6B show another version of a conveyor belt module with both upper and lower rollers 36, 42. The belt module 106 has a monolithic edge portion 108 that accommodates wheels 74 mounted on axles 80 whose ends are retained in cavities 110, 111 in the edge portion.

Figure 7A:
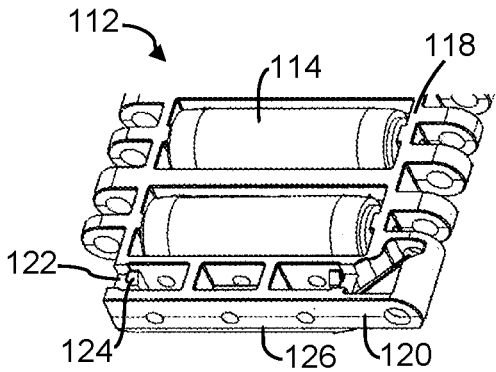
FIGS. 7A-7C are oblique, top plan, and side elevation views of a side edge of a seventh version of a conveyor belt module embodying features of the invention.
Figure 7B:
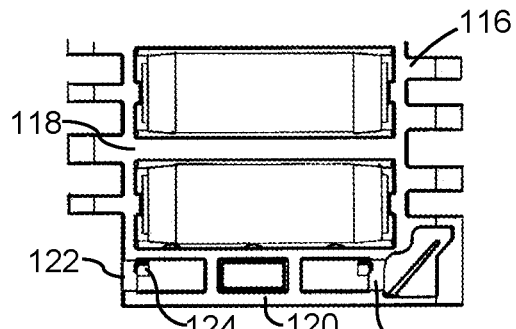
Figure 7C:
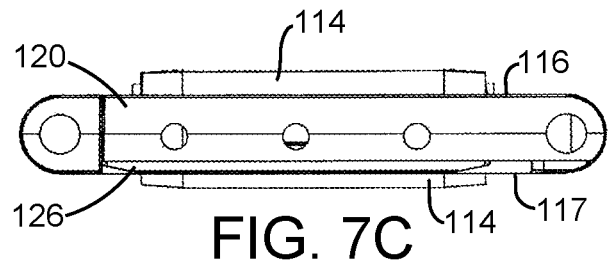

Another version of a conveyor belt module embodying features of the invention is shown in FIGS. 7A-7C. In this version the belt module 112 has a single layer of rollers 114 with salient portions that protrude past the top 116 and the bottom 117 of the module body 118. The module 112 has an edge portion 120 that is monolithically formed with the module body 118. Retention structure 122 in the monolithic edge portion 120 retains snap-in tabs 124 on a wear pad 126 in place. The roller 114 extends to a level below the level of the wear pad 126.

Figure 8A:
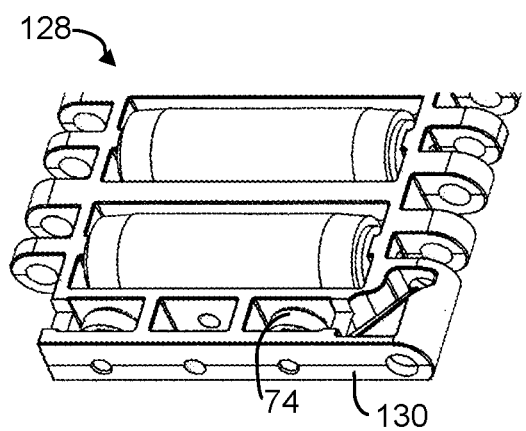
FIGS. 8A-8C are oblique top, oblique bottom, and side elevation views of a side edge of an eighth version of a conveyor belt module embodying features of the invention.
Figure 8B:
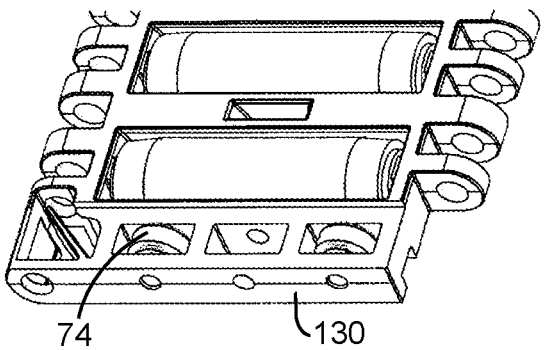
Figure 8C:
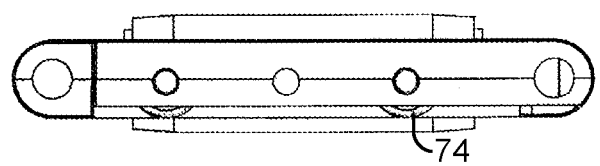

The conveyor belt module 128 shown in FIGS. 8A-8C is the same as that in FIGS. 7A-7C, except that it has a monolithic edge portion 130 that retains wheels 74 rather than a wear pad.

Figure 9:
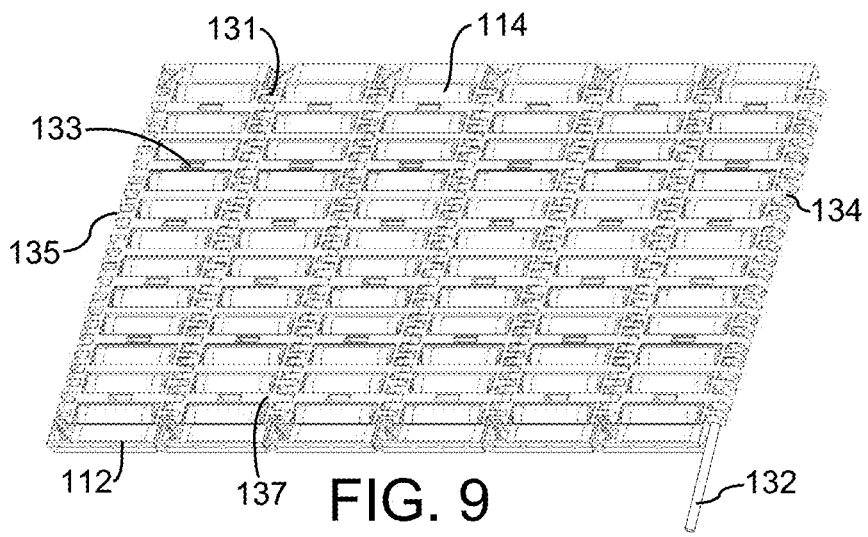
FIG. 9 is an isometric view of a portion of the bottom of a conveyor belt constructed of conveyor belt modules as in FIGS. 7A-8C.

FIG. 9 shows a bottom view of a few conveyor belt modules 112 as in FIGS. 7A-7C connected together at hinge joints 131 by hinge rods 132 received in lateral passageways formed by the aligned holes through the interleaved hinge elements 134, 135 of adjacent belt modules. The modular conveyor belt is conventionally trained around drive and idle sprockets (not shown) whose teeth are received in drive pockets 133 in the bottom 137 of the belt between the rollers 114. The drive sprockets are conventionally mounted on a drive shaft (not shown) rotated by an electric motor (not shown).

Figure 10:
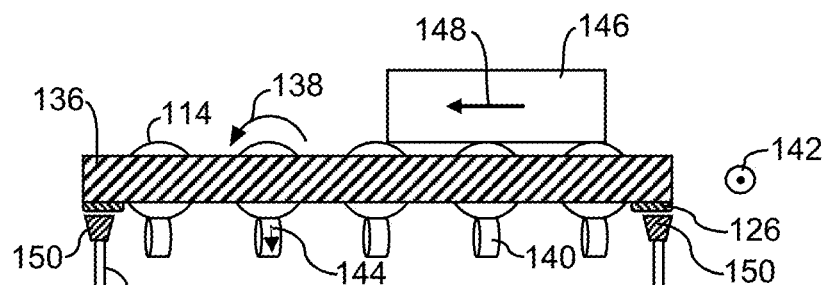
FIG. 10 is a cross sectional elevation view of a conveyor belt as in FIGS. 7A-7C with its rollers activated in a first direction by a roller-activation system in a conveyor carryway.
Figure 11:
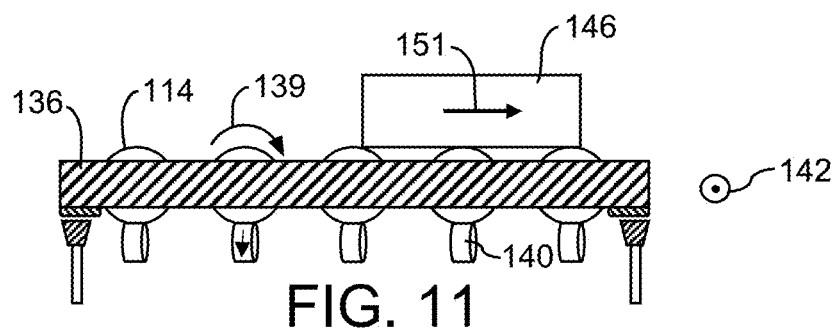
FIG. 11 is a cross sectional elevation view as in FIG. 10 with the belt rollers activated in an opposite second direction.
Figure 12:
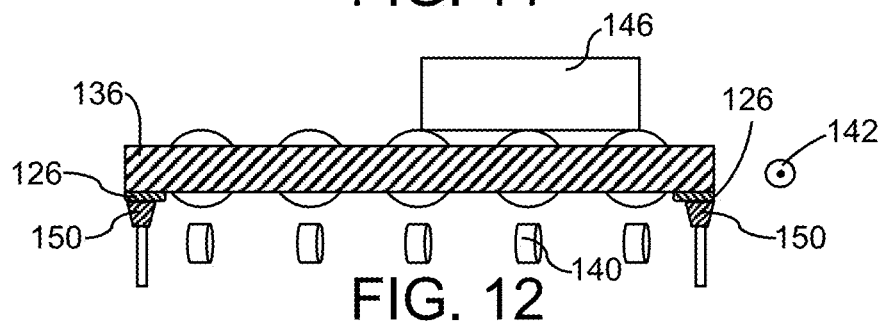
FIG. 12 is a cross sectional elevation view as in FIGS. 10 and 11 with the belt rollers deactivated and the side edge of the belt supported by carryway wearstrips.

FIGS. 10-12 show a modular conveyor belt 136 constructed of belt modules 112 as in FIGS. 7A-7C in a sorting conveyor. In FIG. 10 the belt rollers 114 are activated to rotate in the direction of arrow 138 as they ride on the peripheries of freely rotatable activation rollers 140 in a roller-activation system while the belt 136 advances in a direction of belt travel 142 (out of the page in FIG. 10). The activation rollers 140 rotate as indicated by arrow 144 on axes oblique to the direction of belt travel 142 and to the axes of rotation of the belt rollers 114. Articles 146 atop the belt rollers 114 are pushed in the direction of arrow 148 to the left side of the belt. The activation rollers 140, when raised as in FIG. 10, also support the weight of the belt 136 in the carryway. Because the belt's wear pads 126 do not extend down as far as the belt rollers 114, they only lightly contact or do not contact wearstrips 150 mounted at both sides of the carryway in the conveyor frame 152.

To sort articles 146 off the opposite (right) side of the conveyor belt 136, the roller-activation system, as shown in FIG. 11, orients the axes of rotation of the activation rollers 140 at an oblique angle relative to the direction of belt travel 142 that is the mirror image of the oblique angle of the activation rollers in FIG. 10. That causes the belt rollers 114, as they roll along the activation rollers 140, to rotate in the direction of arrow 139, which pushes articles 146 toward the right as indicated by arrow 151.

When the activation rollers 140 of the roller-activation system are lowered from their raised position in FIGS. 10 and 11 by an actuator (not shown) to a lowered position as in FIG. 12, they are no longer in position to cause the belt rollers 114 to rotate. So an article 146 atop the belt rollers 114 remains stationary. And the conveyor belt 136, whose weight is no longer supported by the activation rollers 140, is supported by the wearstrips 150 on which the wear pads 126 at each side of the belt slide as the belt advances in the direction of belt travel 142. Because the belt's outer edges bear the weight of the belt, wear-resistant wear pads 126 that are replaceable extend the useful life of the belt.

Although the invention has been described in detail in a few different versions, other versions are possible. Features such as wear pads, wheels, monolithic mounting bases, detachable edge portions, monolithic edge portions, passive edge rollers, single belt rollers, and upper and lower belt rollers may be combined in various other combinations than those described in detail. Furthermore, the belt rollers could be arranged to rotate on axes oblique to the direction of belt travel. And the roller-activation system could provide a flat surface on which the oblique belt rollers ride. The roller-activation system could provide carryway rollers whose axes of rotation are in the direction of belt travel. The roller-activation system, instead of raising and lowering the activation rollers into and out of contact with the belt rollers, could laterally displace the activation rollers or otherwise move the activation rollers from an activated position, in which they contact the belt rollers, and a deactivated position, in which they do not contact the belt rollers. So, as these few examples suggest, the scope of the claims is not meant to be limited to the exemplary versions used to describe the invention.

What is claimed is:

1. A conveyor belt module comprising:
   a module body extending in a length direction from a first end to a second end, in a width direction from a first side to a second side, and in thickness from a top to a bottom;
   a first plurality of belt rollers mounted in the module body with salient portions protruding outward of the bottom of the module body to a first level;
   a first edge portion on the first side of the module body and/or a second edge portion on the second side of the module body;
   wherein each edge portion includes a bearing surface that extends to a second level between the first level and the bottom of the module body.

2. A conveyor belt module as claimed in claim 1 wherein the bearing surface is formed on the periphery of a wheel rotatable about an axis extending in the width direction of the module body.

3. A conveyor belt module as claimed in claim 1 wherein the bearing surface comprises a wear pad made of a low-friction durable material.

4. A conveyor belt module as claimed in claim 3 wherein the wear pad has tabs and each edge portion has structure coacting with the tabs for detachably retaining the wear pad to the edge portion.

5. A conveyor belt module as claimed in claim 1 wherein the bearing surface is detachable from the module body.

6. A conveyor belt module as claimed in claim 1 wherein each edge portion includes a sloped outer side that tapers inwardly toward the top of the module body.

7. A conveyor belt module as claimed in claim 1 wherein the first plurality of belt rollers have salient portions that extend outward of the top of the module to support articles.

8. A conveyor belt module as claimed in claim 1 comprising a second plurality of belt rollers extending outward of the top of the module body and contacting the first plurality of belt rollers so that rotation of the first plurality of belt rollers in a first direction causes the second plurality of belt rollers to rotate in an opposite second direction.

9. A conveyor belt module as claimed in claim 8 wherein the edge portions each include an edge roller not in contact with any of the first plurality of belt rollers and disposed outside of the outermost of the second plurality of belt rollers at the first and second sides and extending outward of the top of the module body.

10. A conveyor belt module as claimed in claim 1 wherein the first edge portion includes a first mounting base monolithically formed with the module body and a first detachable outermost edge member attached to the first mounting base and wherein the second edge portion includes a second mounting base monolithically formed with the module body and a second detachable outermost edge member attached to the second mounting base.

11. A conveyor belt module as claimed in claim 10 wherein the bearing surface of the first edge portion is retained by the first detachable outermost edge member and the bearing surface of the second edge portion is retained by the second detachable outermost edge member.

12. A conveyor belt comprising:
    a series of conveyor belt modules, each including:
      a module body extending in a length direction from a first end to a second end, in a width direction from a first side to a second side, and in thickness from a top to a bottom;
      a plurality of first hinge elements spaced apart along the first end;
      a plurality of second hinge elements spaced apart along the second end;
      a first plurality of belt rollers mounted in the module body with salient portions protruding outward of the bottom of the module body to a first level;
      a first edge portion on the first side of the module body and/or a second edge portion on the second side of the module body;
      wherein the first and second edge portions each include a bearing surface that extends to a second level between the first level and the bottom of the module body;
    wherein the first hinge elements of the conveyor belt modules are interleaved with and connected to the second hinge elements of adjacent ones of the conveyor belt modules to form an endless belt loop.

13. A conveyor belt as claimed in claim 12 wherein the bearing surfaces in the first and second edge portions are detachable.

14. A conveyor belt as claimed in claim 12 wherein the bearing surfaces in the first and second edge portions are formed on the peripheries of wheels rotatable about axes extending in the width direction of the module bodies.

15. A conveyor belt as claimed in claim 12 wherein each edge portion includes a sloped outer side that tapers inwardly toward the top of the module body.

16. A conveyor comprising:
a carryway;
a conveyor belt as in claim 12 supported in the carryway;
a first wearstrip in the carryway under the bearing surface on the first edge portion;
a second wearstrip in the carryway under the bearing surface on the second edge portion;
a roller-activation system in the carryway having a contact surface movable from a first position in contact with the belt rollers to cause the belt rollers to rotate as the conveyor belt advances on the carryway to a second position out of contact with the belt rollers;
wherein the weight of the conveyor belt is borne by the roller-activation system in the first position and by the first and second wearstrips when the roller-activation system is in the second position.

\* \* \* \* \*